Jan. 19, 1965  R. DENK  3,166,264
ELECTRICAL DRIVE FOR MOTION PICTURE CAMERAS
Filed Dec. 20, 1962  2 Sheets-Sheet 1
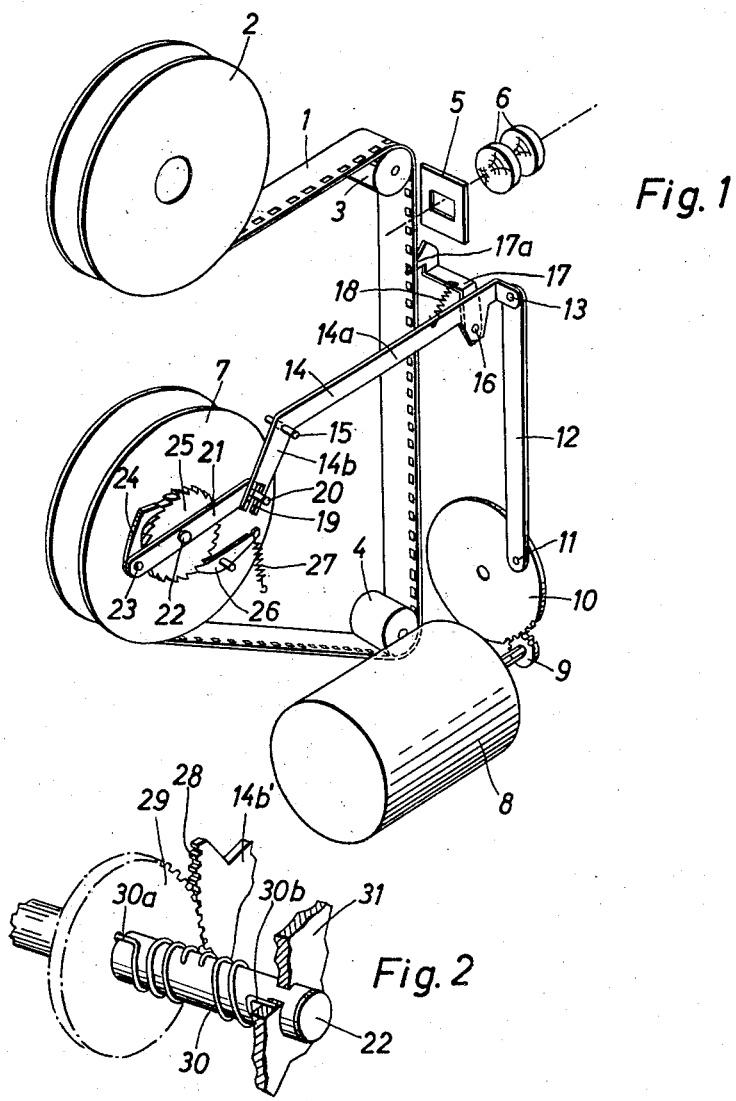
INVENTOR.
RICHARD DENK
BY
Michael S. Striker United States Patent Office 3,166,264
Patented Jan. 19, 1965

3,166,264
ELECTRICAL DRIVE FOR MOTION PICTURE CAMERAS
Richard Denk, Munich, Germany, assignor to Agfa Aktiengesellschaft, Leverkusen, Germany
Filed Dec. 20, 1962, Ser. No. 246,252
Claims priority, application Germany, Jan. 13, 1962, A 39,209
7 Claims. (Cl. 242—55.11)

The present invention relates to cameras.

More particularly, the present invention relates to motion picture cameras, and especially to structure for driving motion picture cameras.

Motion picture cameras are conventionally driven from electric motors or spring motors, and no particular difficulties are encountered as long as the camera is of a certain size so that it can conveniently accommodate such motors and the transmissions driven thereby, these motors being used to drive the shutter, the claw, and the take-up spool. In some cameras which are driven by electric motors, flywheels are used in order to smooth out the lack of uniformity in the load on the motor.

However, when dealing with cameras which are of an extremely small size, it becomes necessary to use electric motors of an extremely small diameter and capable of exerting a turning moment on the order of approximately 5-8 cmg. It is not possible to provide flywheels for such cameras and during the advancing of the film by the claw which is driven from such a motor, there is a peak in the magnitude of the turning moment which cannot be met by the motor itself without taking any further steps. The result is variations in the speed of rotation of the motor and the structure driven, thereby resulting in non-uniform exposure of individual film frames.

It is a primary object of the present invention to provide a motion picture camera of the above type which is capable of operation by a small electric motor of the type referred to above without, however, encountering the drawbacks discussed above.

Thus, it is an object of the present invention to provide for a small motion picture camera a small electric motor and a structure associated therewith which enables the motor to provide the force necessary to operate the various parts of the camera without requiring any flywheel masses or the like and without resulting in any lack of uniformity in the exposure of the film frames.

In particular, it is an object of the present invention to provide a structure of the above type which will not be subjected to the peak turning moments which are normally encountered with conventional structures so that a relatively small motor is capable of providing the required forces without difficulty.

Also, the objects of the present invention include a camera of the above type in which the single small electric motor is capable of efficiently driving structure which rotates the shutter, advances the film, and winds the take-up spool.

Also, the objects of the present invention include the provision of a structure of the above type which is exceedingly simple and compact as well as reliable in operation.

With the above objects in view the invention includes, in a motion picture camera, a single electric motor which is to be used for driving the shutter, the claw, and the take-up spool. In accordance with the present invention the motor is operatively connected through a suitable transmission to a lever means of the invention, and this lever means is oscillated back and forth by the transmission of the invention. A one-way drive is operatively connected to the lever means to be driven thereby and is operatively connected to a rotary take-up spool shaft which is adapted to carry the take-up spool for winding exposed film thereon, so that with this structure the oscillating lever means will turn the take-up spool only intermittently during turning of the lever means in only one of its directions of movement, and with the structure of the invention the intermittent movement of the take-up spool is carried out at a frequency which is equal to the frequency with which the film frames are exposed.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings in which:

FIG. 1 is a perspective, diagrammatic illustration of that part of the motion picture camera which is provided with the structure of the invention;

FIG. 2 is a fragmentary perspective illustration of a one-way drive which is different from a one-way drive which forms part of the structure of FIG. 1;

Figure 3:
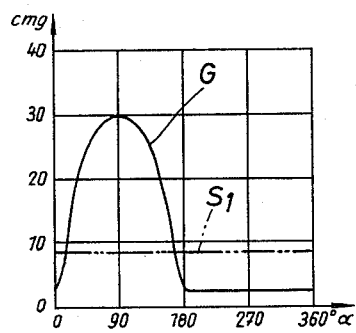
FIG. 3 is a graph illustrating the turning moments of a structure where the take-up spool is continuously driven, FIG. 3 showing curves of the turning moments exerted by a single motor in connection with the driving of the take-up spool and the advancing of the film.
Figure 5:
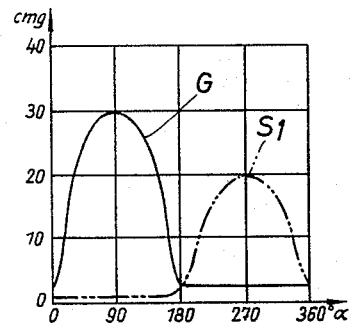
FIG. 5 is a graph which shows curves of the turning moments used for advancing the film and for intermittently driving the take-up spool, in accordance with the present invention.

Referring to FIG. 1, there is diagrammatically illustrated therein a supply spool 2 which supplies the film 1 which is unwound from the supply spool 2 and which is guided by the rollers 3 and 4 to the take-up spool 7, the film advancing past a film gate 5 and an objective 6, as is well known in the art. The camera includes a single, small electric motor 8 which is electrically connected with any suitable batteries so that the electric motor 8 will be energized as desired by the operator in any manner well known in the art, and a transmission means which is driven by the motor 8 includes a pinion 9 directly driven from the motor 8 and a gear 10 meshing with the pinion 9 and supported for rotation about its axis, this gear 10 carrying a pin 11 spaced from the turning axis of the gear 10, so that the gear 10 and the pin 11 form a crank. The crank pin 11 is pivotally connected with one end of an elongated connecting rod 12 whose opposite end is pivotally connected, by a pivot pin 13, with an elongated lever means 14 in the form of an elongated lever pivotally supported by a pivot means 15 intermediate its ends so that the lever 14 includes the pair of lever arms 14a and 14b. In the region of the free end of the lever arm 14a, the lever means 14 carries a pin 16 which serves to connect pivotally to the lever 14 a claw means 17 in the form of an elongated member angularly bent as shown in FIG. 1, and the claw 17 includes a tooth 17a which cooperates with the perforations of the film strip 1 in a manner well known in the art, and the spring 18 is connected at one end to the claw 17 and at its opposite end to the lever arm 14a so as to urge the tooth 17a toward the film strip.

The other arm 14b of the lever means 14 is formed with a slot 19 which receives a pin 20 which is fixed to one end of a two-armed lever 21 which is supported for turning movement on the take-up spool shaft 22, this shaft 22 being supported for rotation about its axis and being connected to the take-up spool 7 so that the latter rotates with the shaft 22 in a manner well known in the art. The lever 21 carries at its end distant from the lever arm 14b a pin 23 which serves to pivotally connect to the lever 21 a pawl 24 which is urged in a clockwise direction, as viewed in FIG. 1, by an unillustrated spring and which cooperates with the teeth of a ratchet wheel 25 which surrounds and frictionally engages the shaft 22, the frictional engagement between the inner periphery of the ratchet wheel 25 and the exterior surface of the shaft 22 being such that these elements cooperate in the manner of a slip-clutch to provide for compensation for the increased diameter of the take-up spool as film is wound thereon, the ratchet wheel 25 being capable of slipping, when necessary, with respect to the shaft 22 but otherwise turning the latter together with the wheel 25 when the latter is advanced by the pawl 24. A holding pawl 26 is supported for turning movement on a pivot pin which is carried by a stationary part of the camera, and a spring 27 is operatively connected to the pawl 26 to urge its free end into engagement with the teeth of the ratchet 25, this holding pawl 26 serving to prevent turning of the ratchet 25 in a counterclockwise direction, as viewed in FIG. 1, so that the ratchet 25 will not turn in a counterclockwise direction when the pawl 24 slips back with respect to the ratchet 25 in order to engage the next tooth for advancing the ratchet 25 in a clockwise direction.

During operation of the camera the motor 8 is of course energized and rotates the pinion 9. Assuming that the crank gear 10 turns in a clockwise direction, as viewed in FIG. 1, then in the illustrated position of the parts the lever means 14 will turn in a clockwise direction as a result of the movement transmitted thereto from the crank gear 10 through the connecting rod 12, and thus the claw means 17 is pulled downwardly in order to advance the film, the stroke provided through the crank structure being such that the film will be advanced by a distance equal to one film frame. Of course, during this time the unillustrated shutter covers the film gate 5 so that the film is not exposed while it is being advanced to the next film frame. During this time, when the lever means 14 is turned in a clockwise direction, as viewed in FIG. 1, the lever 21 is turned in a counterclockwise direction, as viewed in FIG. 1, with the result that the pawl 24 slides with respect to the ratchet 25 moving back into engagement with the next tooth, and at this time the ratchet 25 is prevented from turning by the holding pawl 26. As soon as the crank pin 11 moves beyond its bottom dead-center position, these directions of movement are reversed, the lever means 14 being turned now in a counterclockwise direction while the lever 21 is turned in a clockwise direction, as viewed in FIG. 1. As a result the claw means 17 is moved upwardly so that the tooth 17a thereof will in a known way move out of the film perforation into which it extended during its film-advancing stroke and will slide along the film up to the next perforation, and during this time the film frame which remains stationary in alignment with the optical axis is exposed, the shutter uncovering the film gate 5, and at the same time the clockwise turning of the lever 21 causes the pawl 24 to turn the ratchet 25 in a clockwise direction so that the shaft 22 will be turned in a clockwise direction, thus turning the take-up spool 7 so as to wind the film thereon.

The drive for the unillustrated shutter is omitted for the sake of clarity. With the structure of the invention the lever means 14 is oscillated first in one direction and then in the opposite direction, and during the turning of the lever means 14 in a clockwise direction, as viewed in FIG. 1, the film is advanced by one film frame while the pawl 24 slides along the teeth of the ratchet 25, and this latter action requires practically no energy, and during the subsequent turning of the lever 14 in a counterclockwise direction back to its starting position the take-up spool is turned so as to wind the film thereon, and during this latter operation the claw is returned to its starting position without expenditure of any particular energy for this purpose. The necessary turning moment for the entire assembly is therefore determined by the maximum turning moment of the drive, which requires the greatest amount of energy, and the maximum amount of energy is required to advance the claw along its film-advancing stroke.

It will be noted that with this construction the take-up spool shaft 22 is intermittently turned at a frequency which is equal to the frequency with which the film frames are exposed.

FIG. 2 illustrates another embodiment of a one-way drive means, the pawl-and-ratchet assembly of FIG. 1 of course forming a one-way drive means for the take-up spool shaft 22. With the structure of FIG. 2, the lever arm 14b', which corresponds to the lever arm 14b, is integrally formed with a gear segment 28 which meshes with a gear 29 which is freely turnable on the take-up spool shaft 22. A spring 30a is coiled about the shaft 22 and has one end fixed to the gear 29. Another spring 30 is likewise coiled about the shaft 22 and has its end 30b fixed to a stationary wall 31 of the camera which serves as a bearing for the shaft 22. When the gear 29 is turned by the lever means in a clockwise direction, it is clear that the coils of the spring 30a will tighten on and grip the shaft 22 so as to turn the latter with the gear 29, while when the gear 29 turns in a counterclockwise direction with respect to the shaft 22 the coils of the spring 30a will tend to unwind and will loosely surround the shaft 22 so that the latter will not be turned in a counterclockwise direction with the gear 29, whereas in this case the spring 30 will tighten and thus prevent the take-up spool from slipping back during counterclockwise turning of the lever means when the claw means is moved along its return stroke.

Thus, the structure of FIG. 2 also forms a one-way drive which acts as a friction clutch and which serves to turn the shaft 22 only in one direction. Of course any suitable ratchet and holding pawl similar to that of FIG. 1, for example, being operatively connected to the take-up spool to prevent turning of the latter in the reverse direction, could also be provided.

Figure 4:
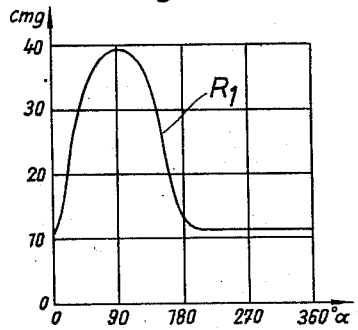
FIG. 4 is a graph illustrating the addition of the curves of FIG. 3.
Figure 6:
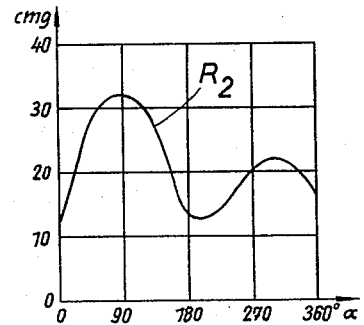
FIG. 6 is a graph illustrating the addition of the curves of FIG. 5.

In the graphs which are illustrated in FIGS. 3–6, the abscissas show the turning of the crank wheel 10 through the angle $\alpha$, while the ordinates show the turning moments in cmg. The curve G of FIG. 3 shows the variations in the turning moment force for the claw drive, while the curve $S_1$ shows the constant moment required for continuously turning the take-up spool, as is conventional. Thus, from FIG. 4, the curve $R_1$ results, this latter curve being derived from the addition of the curves G and $S_1$ of FIG. 3, and it will be noted that the maximum turning moment is slightly less than 40 cmg. In FIG. 5 the curve G is again illustrated, but FIG. 5 shows the curve $S_1$ which results from intermittent turning of the take-up spool as is carried out with the structure of the present invention, and the addition of the curves of FIG. 5 provide the curve $R_2$ of FIG. 6. While a comparison of FIGS. 4 and 6 shows that the average power expenditure remains substantially the same in both of these figures, nevertheless it is clear that the maximum turning moment requirement has been substantially reduced with the operation shown in FIG. 6. Thus, with the structure of the invention it is possible to perform the same amount of work without, however, requiring the use of any flywheel masses which would undesirably load a small, weak motor, and thus the relatively small motor which can be used with the structure of the invention can have a smaller diameter than has heretofore been required, so that the size of the entire camera can be maintained relatively small.

It will be understood that each of the elements described above, or two or more together, may also find a useful application in other types of cameras differing from the types described above.

While the invention has been illustrated and described as embodied in motion picture cameras, it is not intended to be limited to the details shown, since various modifications and structural changes may be made without departing in any way from the spirit of the present invention.

What is claimed as new and desired to be secured by Letters Patent is:

1. In a motion picture camera, in combination, a rotary take-up spool shaft adapted to carry a take-up spool on which exposed film is to be wound; an electric motor; film-advancing means for advancing film past a film gate; and transmission means operatively connected to said electric motor and said shaft and film-advancing means for intermittently turning said shaft during given intervals and for actuating said film-advancing means during intervals which alternate with said given intervals, so that the winding of exposed film on a take-up spool carried by said shaft takes place intermittently during said given intervals when said motor is not loaded by said film-advancing means while actuation of the latter takes place when said motor is not loaded by turning of said spool shaft.

2. In a motion picture camera, in combination, lever means; pivot means supporting said lever means for turning movement; claw means operatively connected to said lever means to be moved thereby along a film-advancing stroke when said lever means turns in one direction and to be returned thereby back to the beginning of said stroke when said lever means turns in an opposite direction; a rotary take-up spool shaft adapted to carry a take-up spool to turn the latter for winding exposed film thereon; one-way drive means operatively connected to said lever means and to said take-up spool shaft for turning the latter to wind film on a take-up spool thereon only when said lever means turns in said opposite direction during return of said claw means to the start of said film-advancing stroke thereof, so that the turning of said lever means is not transmitted to said take-up spool shaft during advance of film by said claw means and is transmitted to said shaft only during the return movement of said claw means; an electric motor; and transmission means operatively connected to said electric motor and said lever means for oscillating the latter first in said one direction and then in said opposite direction during operation of said motor, whereby film will be intermittently wound on a take-up spool at the same frequency as film frames are exposed in the camera.

3. In a camera as recited in claim 2, said one-way drive means being in the form of a pawl-and-ratchet mechanism operatively connected to said shaft and to said lever means to be moved by the latter in a direction which turns said shaft only during turning of said lever means in said opposite direction.

4. In a camera as recited in claim 2, said one-way drive means including a rotary gear freely turnable on said shaft, a gear sector connected to said lever means for turning movement therewith and meshing with said gear to turn the latter back and forth on said shaft, and a spring coiled about said shaft and connected to said gear for gripping said shaft and transmitting rotation of said gear thereto only during turning of said lever means in said opposite direction.

5. In a motion picture camera, in combination, an elongated lever; pivot means supporting said lever for turning movement intermediate the ends thereof so that said lever has a pair of lever arms; claw means operatively connected to one of said lever arms to be moved by said lever along a film-advancing stroke when said lever turns in one direction and along a return stroke when said lever turns in an opposite direction; a rotary take-up spool shaft adapted to carry a take-up spool for winding exposed film thereon; one-way drive means operatively connected to said shaft and to the other arm of said lever to be actuated by the latter for turning said shaft only when said lever turns in said opposite direction during the return stroke of said claw means; an electric motor; and transmission means driven by said electric motor and operatively connected to said lever for oscillating the latter first in said one direction and then in said opposite direction.

6. In a motion picture camera, in combination, an elongated lever; pivot means supporting said lever for turning movement intermediate the ends thereof so that said lever has a pair of lever arms; claw means operatively connected to one of said lever arms to be moved by said lever along a film-advancing stroke when said lever turns in one direction and along a return stroke when said lever turns in an opposite direction; a rotary take-up spool shaft adapted to carry a take-up spool for winding exposed film thereon; one-way drive means operatively connected to said shaft and to the other arm of said lever to be actuated by the latter for turning said shaft only when said lever turns in said opposite direction during the return stroke of said claw means; an electric motor; and transmission means driven by said electric motor and operatively connected to said lever for oscillating the latter first in said one direction and then in said opposite direction, said transmission means including a rotary crank member driven by said motor and operatively connected to said lever for oscillating the same.

7. In a motion picture camera, in combination, a single electric motor adapted to be used for advancing film, for rotating the shutter, and for rotating a take-up spool on which exposed film is wound; a rotary take-up spool shaft adapted to carry the take-up spool; film-advancing means and transmission means driven by said motor and operatively connected to said film-advancing means and shaft for intermittently turning the latter during given intervals, to wind film on a take-up spool, and for actuating said film-advancing means during intervals which alternate with said given intervals so that winding of exposed film on said take-up spool takes place intermittently during said given intervals when said motor is not loaded by said film-advancing means while actuation of the latter takes place when said motor is not loaded by turning of said spool shaft.

References Cited by the Examiner

UNITED STATES PATENTS 2,310,947   2/43   Fischer _____ 242—55.14

MERVIN STEIN, *Primary Examiner.*